(12) United States Patent
Park et al.

(10) Patent No.: US 11,656,793 B2
(45) Date of Patent: May 23, 2023

(54) CONTROLLER FOR MANAGING CACHE DATA, MEMORY SYSTEM INCLUDING THE SAME, AND METHOD PERFORMED BY THE SAME

(71) Applicant: SK hynix Inc., Icheon (KR)

(72) Inventors: Soo Jin Park, Icheon (KR); Ji Yeun Kang, Icheon (KR); Won Hyoung Lee, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 17/501,938

(22) Filed: Oct. 14, 2021

(65) Prior Publication Data

US 2022/0317920 A1    Oct. 6, 2022

(30) Foreign Application Priority Data

Apr. 6, 2021 (KR) .................. 10-2021-0044876

(51) Int. Cl.
*G06F 12/00* (2006.01)
*G06F 3/06* (2006.01)
*G06F 12/02* (2006.01)

(52) U.S. Cl.
CPC .......... *G06F 3/0656* (2013.01); *G06F 3/0604* (2013.01); *G06F 3/0659* (2013.01); *G06F 3/0673* (2013.01); *G06F 12/0246* (2013.01); *G06F 2212/7201* (2013.01)

(58) Field of Classification Search
CPC .... G06F 3/0656; G06F 3/0604; G06F 3/0659; G06F 3/0673; G06F 12/0246; G06F 2212/7201
USPC ........................................................ 711/154
See application file for complete search history.

(56) References Cited

FOREIGN PATENT DOCUMENTS

| CN | 1176433 A | * 3/1998 | .......... G06F 11/2041 |
|---|---|---|---|
| KR | 1020200019429 | 2/2020 | |
| KR | 1020200122685 | 10/2020 | |
| WO | WO2015014302 | * 1/2015 | |

* cited by examiner

*Primary Examiner* — Mardochee Chery

(57) ABSTRACT

A memory system includes a memory device including memory blocks, and a controller configured to in response to a program request or a read request for a selected memory block among the memory blocks being received from a host, store first data to which a first logical address is allocated in a cache group, generate a first entry for the first data stored in the cache group, and in response to second data to which the first logical address is allocated being stored in the cache group after the first data is stored in the cache group, generate a second entry for the second data.

20 Claims, 16 Drawing Sheets

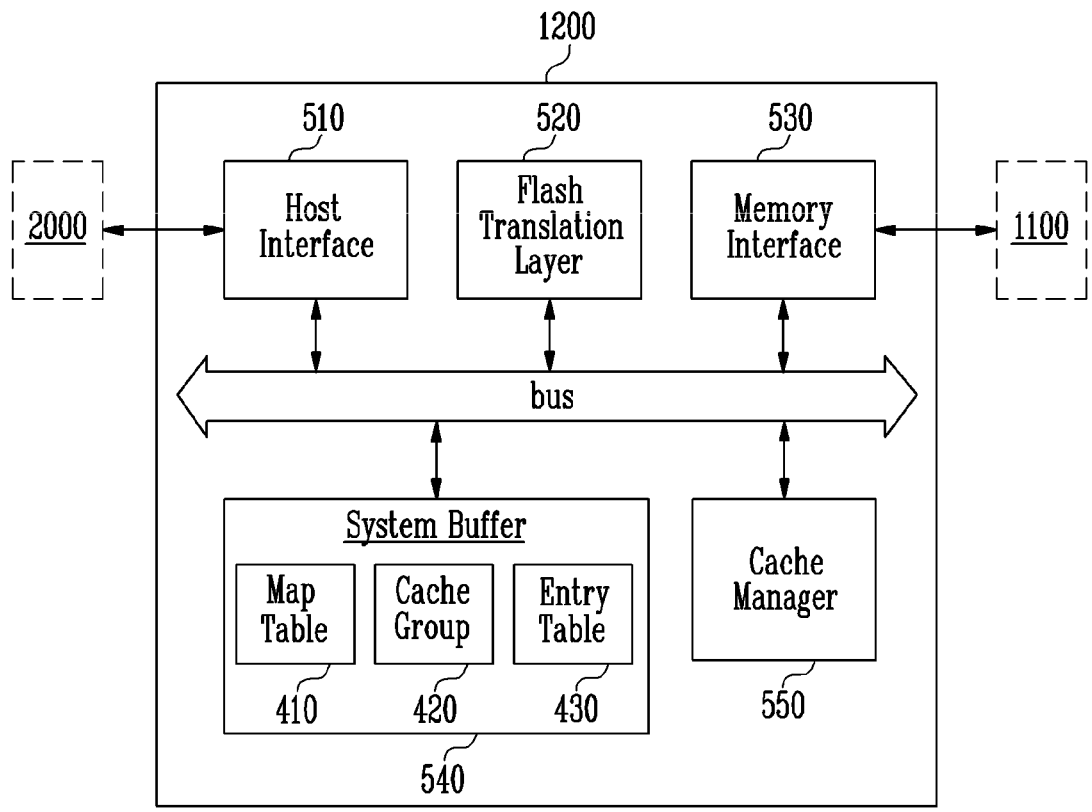

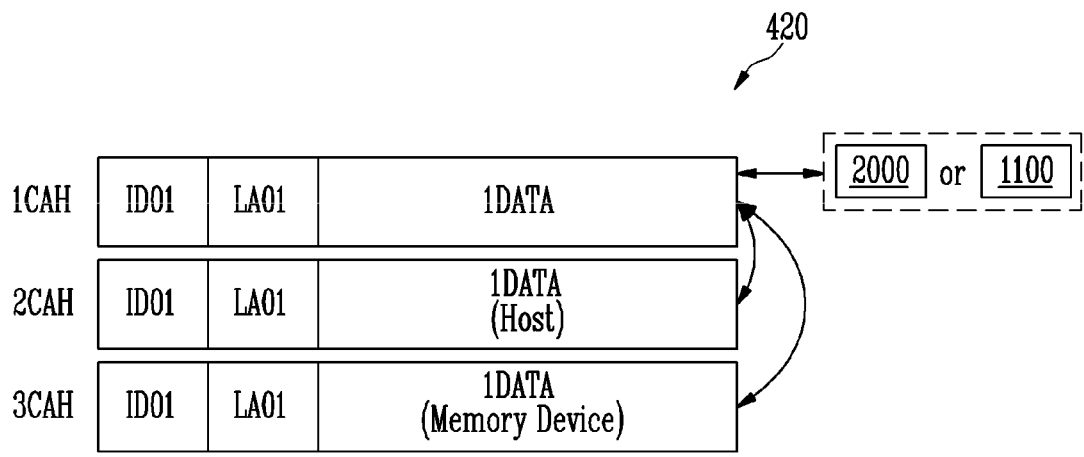

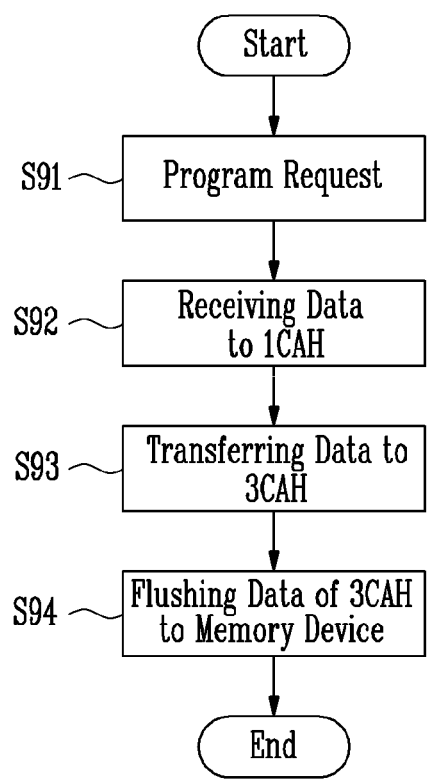

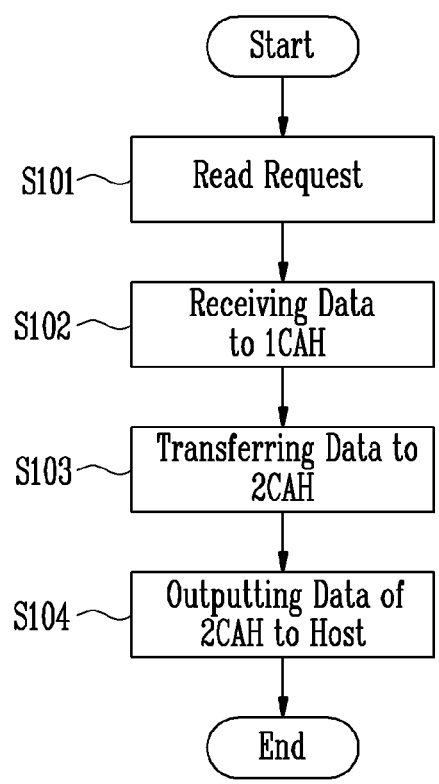

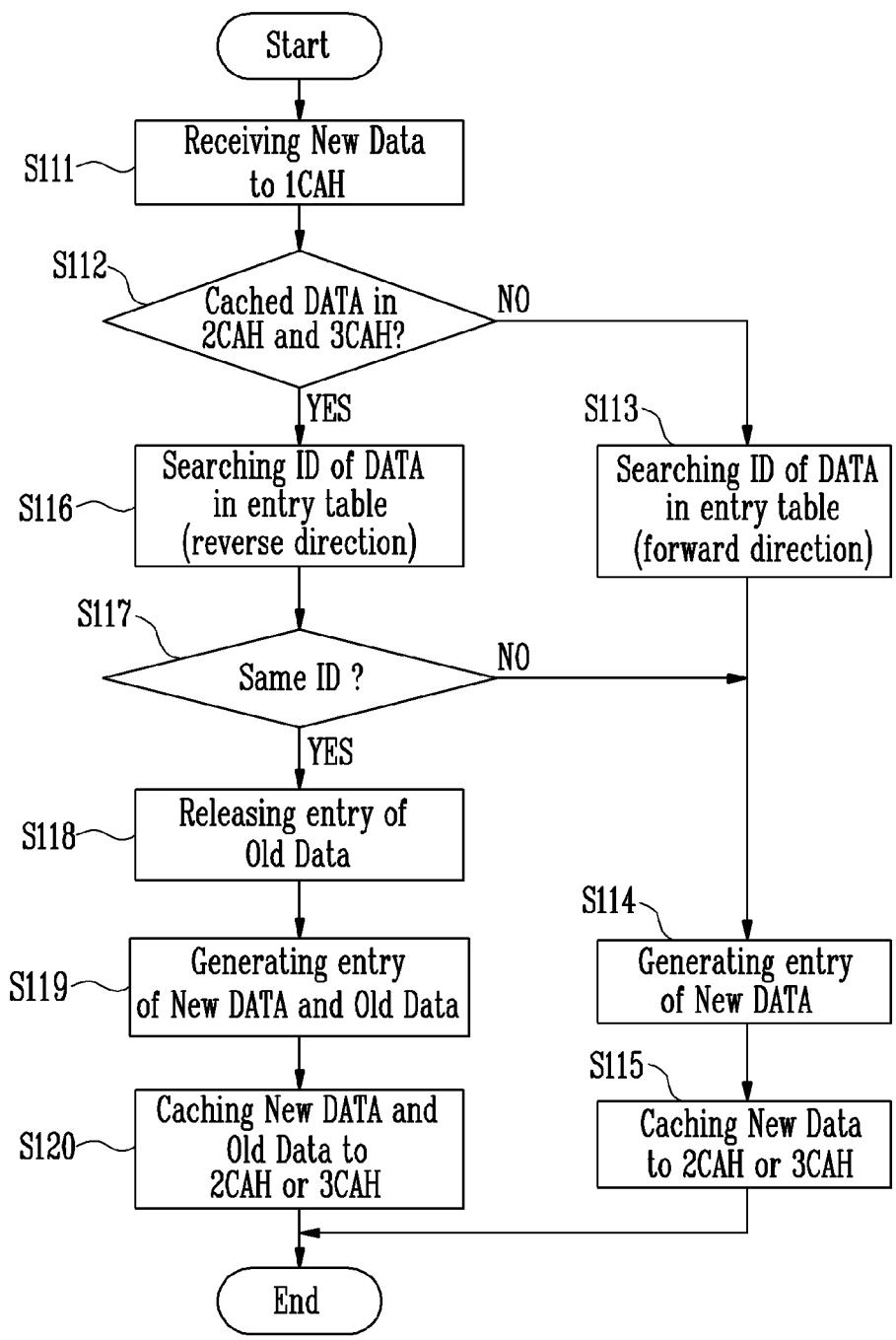

| 1CAH | ID01 | LA01 | 1DATA |
| --- | --- | --- | --- |
| 2CAH | | | |
| 3CAH | | | |

← --- 2000

[430]

| ID# | #CAH | #DATA | ST | NEW | VAL | LAT |
| --- | --- | --- | --- | --- | --- | --- |
| | | | | | | |
| | | | | | | |
| | | | | | | | forward direction ↓

| 1CAH | ID01 | LA01 | 1DATA |
| --- | --- | --- | --- |
| 2CAH | | | |
| 3CAH | ID01 | LA01 | 1DATA |

← --- caching DATA

[430]

| ID# | #CAH | #DATA | ST | NEW | VAL | LAT |
| --- | --- | --- | --- | --- | --- | --- |
| 01 | 3 | 1 | P | 1 | 1 | 1 |
| | | | | | | | entry (generating)

FIG. 13A
| 1CAH | ID01 | LA01 | 2DATA |
|---|---|---|---|
| 2CAH | | | |
| 3CAH | ID01 | LA01 | 1DATA |
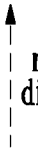
[430]
| ID# | #CAH | #DATA | ST | NEW | VAL | LAT |
|---|---|---|---|---|---|---|
| 01 | 3 | 1 | P | 0 | 1 | 1 |
| | | | | | | |
| | | | | | | |
↑ reverse direction
FIG. 13B
| 1CAH | ID01 | LA01 | 2DATA |
|---|---|---|---|
| 2CAH | | | |
| 3CAH | ID01 | LA01 | 1DATA, 2DATA |
 caching DATA
[430]
| | ID# | #CAH | #DATA | ST | NEW | VAL | LAT |
|---|---|---|---|---|---|---|---|
| ENT1 | 01 | 3 | 1 | P | 0 | 0 | 0 |
| ENT2 | 01 | 3 | 1, 2 | P | 1 | 1 | 1 |
← releasing
← generating

| 1CAH | ID01 | LA01 | 2DATA |
|---|---|---|---|
| 2CAH | ID01 | LA01 | 1DATA |
| 3CAH | | | |

← 1100

[430]

| ID# | #CAH | #DATA | ST | NEW | VAL | LAT |
|---|---|---|---|---|---|---|
| 01 | 2 | 1 | R | 1 | 1 | 1 |
| | | | | | | |
| | | | | | | |

| 1CAH | ID01 | LA01 | 2DATA |
|---|---|---|---|
| 2CAH | ID01 | LA01 | 2DATA |
| 3CAH | | | |

[430]

| | ID# | #CAH | #DATA | ST | NEW | VAL | LAT | |
|---|---|---|---|---|---|---|---|---|
| ENT1 | 01 | 2 | 1 | R | 0 | 0 | 0 | ←— releasing |
| ENT2 | 01 | 2 | 2 | R | 1 | 1 | 1 | ←— generating |

| | | | |
|---|---|---|---|
| 1CAH | ID01 | LA01 | 2DATA |
| 2CAH | | | |
| 3CAH | ID01 | LA01 | 1DATA |

← 1100

[430]

| | ID# | #CAH | #DATA | ST | NEW | VAL | LAT |
|---|---|---|---|---|---|---|---|
| ENT1 | 01 | 3 | 1 | G | 0 | 1 | 1 |
| | | | | | | | |
| | | | | | | | |

| | | | |
|---|---|---|---|
| 1CAH | ID01 | LA01 | 2DATA |
| 2CAH | | | |
| 3CAH | ID01 | LA01 | 2DATA |

[430]

| | ID# | #CAH | #DATA | ST | NEW | VAL | LAT | |
|---|---|---|---|---|---|---|---|---|
| ENT1 | 01 | 3 | 1 | G | 0 | 0 | 0 | ←-- releasing |
| ENT2 | 01 | 3 | 2 | G | 1 | 1 | 1 | ←-- generating |
| | | | | | | | | |

| | | | | |
|---|---|---|---|---|
| 1CAH | ID01 | LA01 | 2DATA | ← 2000 |
| 2CAH | | | | |
| 3CAH | ID01 | LA01 | 1DATA | |

[430]

| | ID# | #CAH | #DATA | ST | NEW | VAL | LAT |
|---|---|---|---|---|---|---|---|
| ENT1 | 01 | 3 | 1 | G | 0 | 1 | 1 |
| | | | | | | | |
| | | | | | | | |

| | | | |
|---|---|---|---|
| 1CAH | ID01 | LA01 | 2DATA |
| 2CAH | | | |
| 3CAH | ID01 | LA01 | 1DATA, 2DATA |

[430]

| | ID# | #CAH | #DATA | ST | NEW | VAL | LAT | |
|---|---|---|---|---|---|---|---|---|
| ENT1 | 01 | 3 | 1 | G | 0 | 0 | 0 | ← releasing |
| ENT2 | 01 | 3 | 1, 2 | P | 1 | 1 | 1 | ← generating |
| | | | | | | | | |

CONTROLLER FOR MANAGING CACHE DATA, MEMORY SYSTEM INCLUDING THE SAME, AND METHOD PERFORMED BY THE SAME

CROSS-REFERENCE TO RELATED APPLICATION

The present application claims priority under 35 U.S.C. § 119(a) to Korean patent application number 10-2021-0044876 filed on Apr. 6, 2021, in the Korean Intellectual Property Office, the entire disclosure of which is incorporated by reference herein.

BACKGROUND

1. Field of Invention

The present disclosure relates to a controller and a memory system including the same, and more particularly, to a controller capable of managing cache data, a memory system including the controller, and a method performed by the controller.

2. Description of Related Art

A memory system may include a memory device in which data is stored and a controller capable of controlling the memory device. The memory device is classified into a volatile memory device and a non-volatile memory device. For example, the volatile memory device has a characteristic in which a speed of a program operation and a read operation is faster than that of the non-volatile memory device, but, stored data is destroyed when supply of power is stopped. The non-volatile memory device has a characteristic in which a speed of the program operation and the read operation is slower than that of the volatile memory device, but, stored data is maintained even though supply of power is stopped.

SUMMARY

An embodiment of the present disclosure provides a controller capable of easily managing data stored in a cache, a memory system including the controller, and a method performed by the controller.

According to an embodiment of the present disclosure, a memory system includes a memory device including memory blocks, and a controller configured to in response to a program request or a read request for a selected memory block among the memory blocks being received from a host, store first data to which a first logical address is allocated in a cache group, generate a first entry for the first data stored in the cache group, and in response to second data to which the first logical address is allocated being stored in the cache group after the first data is stored in the cache group, generate a second entry for the second data.

According to an embodiment of the present disclosure, a controller includes a cache group configured to store data output from a host or a memory device, an entry table store at least one entry including index information corresponding to a logical address allocated to the data and information on a cache in which the data is stored, and a cache manager configured to when logical addresses corresponding to first data and second data stored in the cache group are identical to each other, release a first entry for the first data and generate a second entry for the second data according to operations in which the first data and the second data are processed, the second data being stored to the cache group after the first data is stored to the cache group.

According to an embodiment of the present disclosure, a method of a controller including a cache group and an entry group, the method includes receiving new data transmitted from a host or a memory device and storing the new data in a first cache of the cache group, checking whether old data is cached in second and third caches of the cache group, when it is determined that no old data is cached in the second and third caches, generating an entry for the new data and storing the generated entry in the entry group, and transmitting the new data stored in the first cache to the second cache or the third cache according to an operation request relating to the new data, and when it is determined that old data is cached in the second or third cache, searching for an entry including an index identical to that of the new data stored in the first cache in the entry table, releasing the searched entry, generating an entry for the new data, storing the generated entry in the entry group, and transmitting the new data stored in the first cache to the second cache or the third cache according to the operation request.

According to the present technology, data to which the same logical address is allocated may be efficiently managed.

BRIEF DESCRIPTION OF THE DRAWINGS

FIG. 5 illustrates a controller according to an embodiment of the present disclosure.

FIG. 6 illustrates a map table according to an embodiment of the present disclosure.

FIG. 7 illustrates a cache group according to an embodiment of the present disclosure.

FIG. 8 illustrates an entry table according to an embodiment of the present disclosure.

FIG. 9 is a flowchart illustrating a method of caching data during a program operation according to an embodiment of the present disclosure.

FIG. 10 is a flowchart illustrating a method of caching data during a read operation according to an embodiment of the present disclosure.

FIG. 11 is a flowchart illustrating an entry management method according to an embodiment of the present disclosure.

FIGS. 12A and 12B illustrate a method of managing an entry of new data when the new data is input in a state in which data does not exist in a cache according to an embodiment of the present disclosure.

FIGS. 13A and 13B illustrate a method of managing the entry of the new data when the new data is input in a state in which data exists in the cache according to an embodiment of the present disclosure.

FIGS. 14A and 14B illustrate a method of managing the entry of the new data when data stored in the cache is used according to an embodiment of the present disclosure.

FIGS. 15A and 15B illustrate a method of managing an entry of data when new data having the same logical address as the data stored in the cache is added inside the memory system according to an embodiment of the present disclosure.

FIGS. 16A and 16B illustrate a method of managing an entry of data when new data having the same logical address as the data stored in the cache is added from an outside of the memory system according to an embodiment of the present disclosure.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

Figure 1:
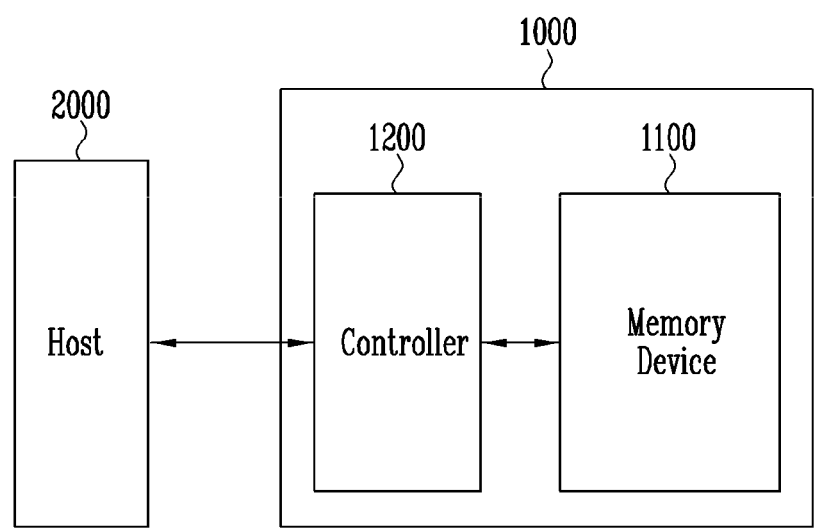
FIG. 1 illustrates a memory system according to an embodiment of the present disclosure.

FIG. 1 illustrates a memory system 1000 according to an embodiment of the present disclosure.

Referring to FIG. 1, the memory system 1000 may be configured to store, erase, or output data in response to a request of a host 2000. For example, the memory system 1000 may include a memory device 1100 capable of storing data, and a controller 1200 capable of communicating between the host 2000 and the memory device 1100. Although the memory system 1000 including one memory device 1100 is shown in FIG. 1, two or more memory devices may be included in the memory system 1000. In the present embodiment, the memory device 1100 may be configured as a non-volatile memory device.

When the request of the host 2000 is input thereto, the controller 1200 may generate a command for controlling the memory device 1100 according to the request. The controller 1200 may be configured to manage mapping information between a logical address used in the host 2000 and a physical address used in the memory device 1100. For example, during a program operation, the controller 1200 may map the logical address used in the host 2000 and the physical address used in the memory device 1100 to each other. During a read operation, the controller 1200 may search for the physical address mapped to the logical address and output data read from the memory device 1100 according to the physical address to the host 2000.

The controller 1200 may include a cache in order to quickly perform the read operation corresponding to the request of the host 2000 or an internal request of the memory system 1000. Here, the cache means a cache memory. The cache memory may be included in the controller 1200. For example, the controller 1200 may temporarily store data in the cache. After that, when a read request for reading the data stored in the cache is input thereto, the controller 1200 may skip performing a read operation on the memory device 1100 and output the data stored in the cache to the host 2000.

When data to which the same logical address is allocated is changed, the controller 1200 may include an entry table for managing the logical address and a cache in which the data is stored. Here, an entry may be system information of the data stored in the cache. For example, when new data is input to a cache in a state that the cache does not store any data, the controller 1200 may generate a new entry for the new data. When new data to which the same logical address is allocated is input to the cache in a state in which there is the existing data stored in the cache, the controller 1200 may release the previously generated entry and generate a new entry including both of the existing data and the new data.

Figure 2:
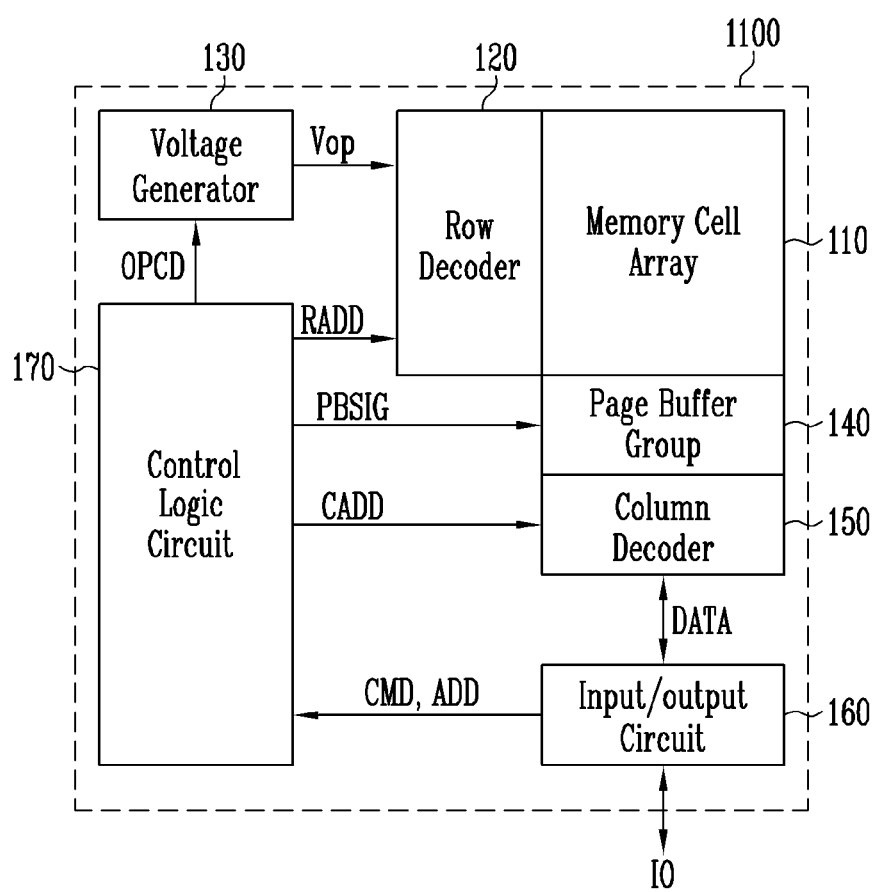
FIG. 2 illustrates a memory device.

FIG. 2 illustrates a memory device. The memory device shown in FIG. 2 may correspond to the memory device 1100 shown in FIG. 1.

Referring to FIG. 2, the memory device 1100 may include a memory cell array 110 in which data is stored, and peripheral circuits capable of performing a program, read, or erase operation.

The memory cell array 110 may include a plurality of memory blocks in which data is stored. Each of the memory blocks includes a plurality of memory cells, and the memory cells may be implemented in a two-dimensional structure in which the memory cells are arranged on a substrate in parallel or a three-dimensional structure in which the memory cells are stacked on the substrate in a vertical direction.

The peripheral circuits may include a row decoder 120, a voltage generator 130, a page buffer group 140, a column decoder 150, and an input/output circuit 160, and a control logic circuit 170.

The row decoder 120 may select one memory block from among the memory blocks included in the memory cell array 110 according to a row address RADD, and transmit operation voltages Vop to the selected memory block.

The voltage generator 130 may generate and output the operation voltages Vop required for various operations, in response to an operation code OPCD. For example, the voltage generator 130 may generate a program voltage, a read voltage, an erase voltage, a pass voltage, a verify voltage, a negative voltage, and the like in response to the operation code OPCD, and selectively output the generated voltages.

The page buffer group 140 may be connected to the memory cell array 110 through bit lines. For example, the page buffer group 140 may include page buffers connected to each of the bit lines. The page buffers may operate simultaneously in response to page buffer control signals PBSIG, and may temporarily store data during the program or read operation. During the read operation or a verify operation, the page buffers may sense a voltage of the bit lines, which varies according to a threshold voltage of the memory cells. That is, it may be determined whether the threshold voltages of the memory cells are lower or higher than the read voltage or the verify voltage, according to a result of a sensing operation performed in the page buffers.

The column decoder 150 may transmit data DATA between the input/output circuit 160 and the page buffer group 140 according to a column address CADD.

The input/output circuit 160 may be connected to the controller 1200 of FIG. 1 through input/output lines IO. The input/output circuit 160 may input/output a command CMD, an address ADD, and the data DATA through the input/output lines IO. For example, the input/output circuit 160 may transmit the command CMD and the address ADD received from the controller 1200 through the input/output lines IO to the control logic circuit 170, and transmit the data DATA received from the controller 1200 through the input/output lines IO to the column decoder 150. The input/output circuit 160 may output the data DATA received from the column decoder 150 to the controller 1200 through the input/output lines IO.

The control logic circuit 170 may output the operation code OPCD, the row address RADD, the page buffer control signals PBSIG, and the column address CADD in response to the command CMD and the address ADD. For example, the control logic circuit 170 may include software that performs an algorithm in response to the command CMD, and hardware configured to output various signals according to the address ADD and the algorithm.

Figure 3:
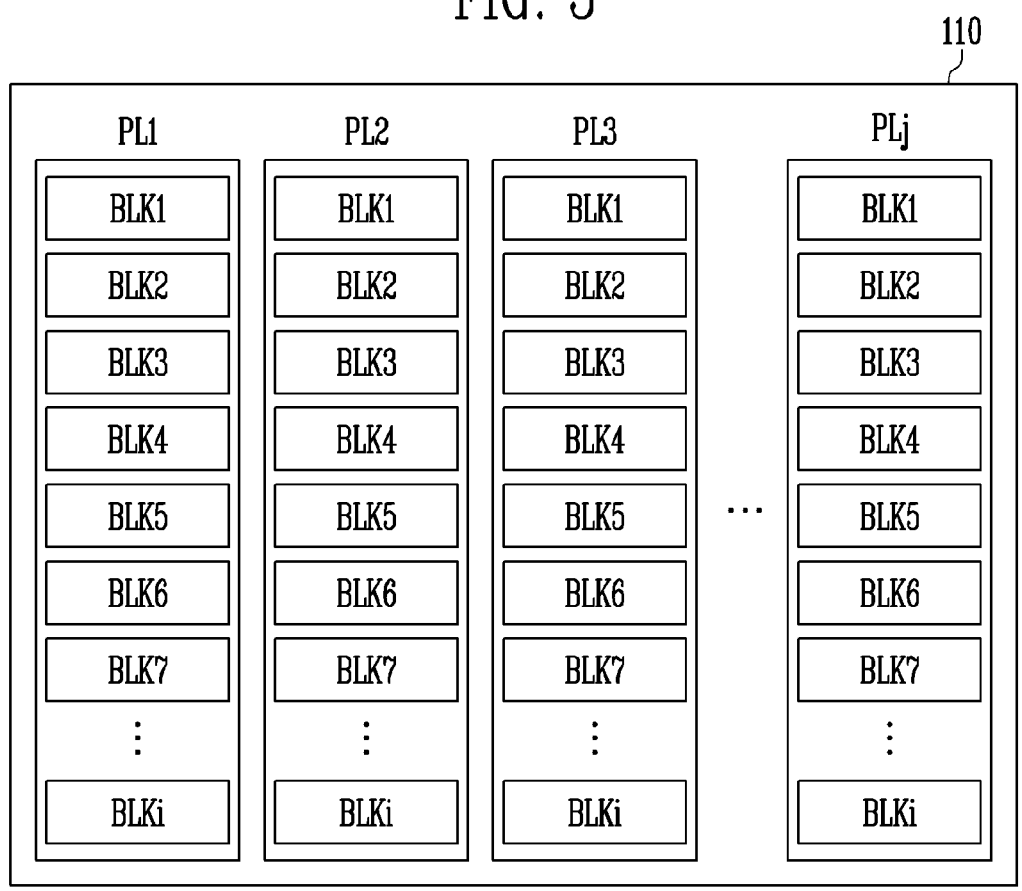
FIG. 3 illustrates a memory cell array.

FIG. 3 illustrates a memory cell array. The memory cell array shown in FIG. 3 may correspond to the memory cell array 110 shown in FIG. 2.

Referring to FIG. 3, the memory cell array 110 may be configured as a single plane or multiple planes. The single plane refers to a configuration in which only one plane is included in the memory cell array 110, and the multiple planes refer to a configuration in which a plurality of planes are included in the memory cell array 110. FIG. 3 shows the memory cell array 110 configured as the multiple planes. The multiple planes PL1 to PLj (j is a positive integer) may be defined as a memory region in which different row decoders and different page buffer groups are connected. For example, when the first to j-th planes PL1 to PLj are included in the memory cell array 110, each of the first to j-th planes PL1 to PLj may include first to i-th memory blocks BLK1 to BLKi (i is a positive integer). The first to i-th memory blocks BLK1 to BLKi included in different planes may be connected to different row decoders and different page buffer groups, and the first to i-th memory blocks BLK1 to BLKi included in the same plane may be connected to the same row decoder and the same page buffer group. The first to i-th memory blocks BLK1 to BLKi may be configured in the same structure.

Figure 4:
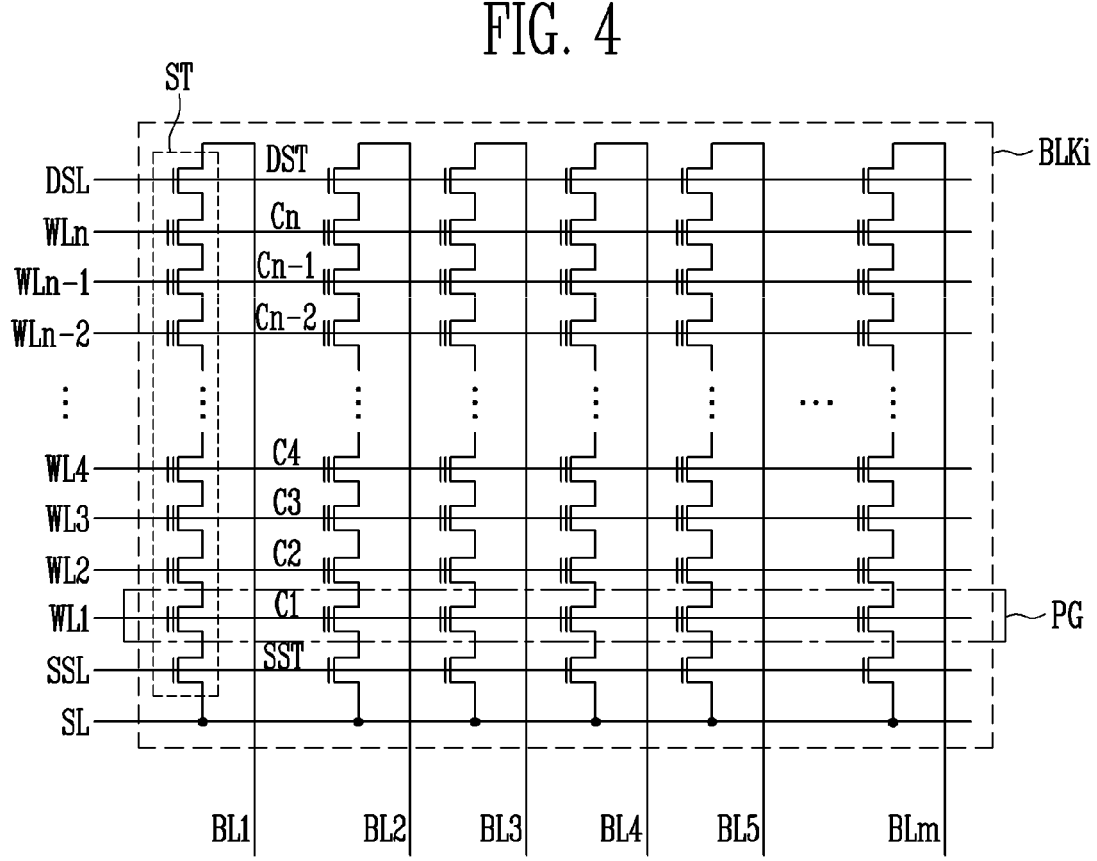
FIG. 4 illustrates a memory block.

FIG. 4 illustrates a memory block.

Referring to FIG. 4, any one memory block BLKi among the plurality of memory blocks BLK1 to BLKi shown in FIG. 3 is shown as an embodiment.

The memory block BLKi may include a plurality of strings ST connected between first to m-th bit lines BL1 to BLm and a source line SL. Each of the strings ST may include a source select transistor SST, first to n-th memories cells C1 to Cn, and a drain select transistor DST connected in series between the source line SL and the first to m-th bit lines BL1 to BLm (m is a positive integer).

Since the memory block BLKi shown in FIG. 4 is a diagram illustrating a configuration of the memory block, the number of source select transistors SST, first to n-th memory cells C1 to Cn, and drain select transistors DST is not limited to the number shown in FIG. 4.

Gates of the source select transistors SST connected to different strings ST may be connected to a source select line SSL, gates of each of the first to n-th memory cells C1 to Cn may be connected to first to n-th the word lines WL1 to WLn, and gates of the drain select transistors DST may be connected to a drain select line DSL.

A group of memory cells connected to the same word line and included in different strings ST may configure one page PG. The program operation and the read operation may be performed in a unit of the page PG.

The memory cells included in the memory block BLKi may be variously programmed according to a program method. For example, the program operation may be performed in a single level cell (SLC) method, a multi-level cell (MLC) method, a triple level cell (TLC) method, or a quadruple level cell (QLC) method. The SLC method is a method in which one bit of data is stored in one memory cell. The MLC method is a method in which two bits of data are stored in one memory cell. The TLC method is a method in which three bits of data are stored in one memory cell. The QLC method is a method in which four bits of data are stored in one memory cell. In addition, five or more bits of data may be stored in one memory cell.

FIG. 5 illustrates a controller according to an embodiment of the present disclosure. The controller shown in FIG. 5 may correspond to the controller 1200 shown in FIG. 1.

Referring to FIG. 5, the controller 1200 may include a host interface 510, a flash translation layer 520, a memory interface 530, a system buffer 540, and a cache manager 550. The host interface 510, the flash translation layer 520, the memory interface 530, the system buffer 540, and the cache manager 550 may exchange control signals and information through a bus. In an embodiment, the system buffer 540 may be implemented with a memory, a register, or the like, the flash translation layer 520 and the cache manager 550 may be implemented with one or more processors.

The host interface 510 may be configured to transmit information between the host 2000 and the controller 1200. For example, during a program operation, the host interface 510 may receive a program request, a logical address, and write data from the host 2000. During a read operation, the host interface 510 may receive a read request and a logical address from the host 2000.

The flash translation layer 520 may be configured to map a logical address used in the host 2000 and a physical address used in the memory device 1100 to each other and manage mapping information between the logical address and the physical address. For example, during the program operation, the flash translation layer 520 may generate a map table 410 by mapping the physical address to the logical address, and store the map table 410 in the system buffer 540. During the read operation, the flash translation layer 520 may find the physical address mapped to the logical address in the map table 410.

The memory interface 530 may be configured to exchange information between the controller 1200 and the memory device 1100.

The system buffer 540 may be configured to store system information used in the controller 1200. For example, the system buffer 540 may be configured of volatile memory cells or non-volatile memory cells, or may be configured of volatile memory cells and non-volatile memory cells. The system buffer 540 may include the map table 410, a cache group 420, and an entry table 430. The map table 410 may be configured to store the mapping information generated and managed by the flash translation layer 520. For example, the logical address and the physical address mapped to the logical address may be stored in the map table 410. The cache group 420 may be configured to temporarily store data received from the host 2000 or data received from the memory device 1100. The data stored in the cache group 420 may be managed by the cache manager 550. The cache group 420 may be configured to store data corresponding to logical addresses by separating the data for each index. The entry table 430 may be configured to store system information for the data stored in the cache group 420. Here, the system information for the data corresponding to the index may be defined as an entry. For example, the entry may include system information such as information on a cache in which the data is stored, information on an index of the cache, information on a recent state of the data, and so on.

The cache manager 550 may generate an index of data stored in the cache group 420 and may generate an entry stored in the entry table 430. The cache manager 550 may be configured to manage the cache group 420 and the entry table 430 according to the generated index and entry. When data corresponding to a certain index is changed during the program or read operation, the cache manager 550 may manage an entry for the changed data among the entries stored in the entry table 430. For example, when new data is added to the existing data to which a logical address is already allocated, the cache manager 550 may change the entry of the existing data so that the existing data and the new data are allocated to the same logical address, by referring to the entry of the existing data, and store the changed entry in the entry table 430.

The controller 1200 may further include various additional components in addition to the components shown in FIG. 5.

FIG. 6 illustrates a map table according to an embodiment of the present disclosure. The map table shown in FIG. 6 may correspond to the map table 410 shown in FIG. 5.

Referring to FIG. 6, the map table 410 may include logical addresses and physical addresses mapped to each other. For example, it is assumed that a first physical address PA01 is mapped to a first logical address LA01 and a second physical address PA02 is mapped to a second logical address LA02 by the flash translation layer 520 during the program operation. The first and second physical addresses PA01 and PA02 each may include an address MD# of a memory device, an address BLK# of a memory block, and an address PG# of a page. The flash translation layer 520 may store newly mapped addresses in the map table 410 during the program operation, and may search for the physical address mapped to the logical address from the map table 410 during the read operation.

FIG. 7 illustrates a cache group according to an embodiment of the present disclosure. The cache group shown in FIG. 7 may correspond to the cache group 420 shown in FIG. 5.

Referring to FIG. 7, the cache group 420 may include at least three caches 1CAH, 2CAH, and 3CAH. For example, the cache group 420 may include the first cache 1CAH configured to exchange data with the host 2000 or the memory device 1100, the second cache 2CAH configured to temporarily store data to be transmitted to the host 2000 among data stored in the first cache 1CAH, and the third cache 3CAH configured to temporarily store data to be transmitted to the memory device 1100 among the data stored in the first cache 1CAH.

For example, during the program operation, first data 1DATA may be data output from the host 2000, and may be temporarily stored in the first cache 1CAH and then transmitted to the third cache 3CAH. That is, since the first data 1DATA input to the controller 1200 during the program operation is required to be transmitted to the memory device 1100, the first data 1DATA may be temporarily stored in the third cache 3CAH that exchanges data with the memory device 1100. For example, in the first cache 1CAH, the first data 1DATA, the first logical address LA01 mapped to the physical address in which the first data 1DATA is to be stored, and a first index ID01 to which the first logical address LA01 is allocated may be stored. The first index ID01 may be configured in a number of bits less than that of the first logical address LA01 in order to quickly find the first logical address LA01.

During the read operation, the first data 1DATA may be data read from the memory device 1100, and may be temporarily stored in the first cache 1CAH and then transmitted to the second cache 2CAH. That is, since the first data 1DATA received by the controller 1200 during the read operation is required to be output to the host 2000, the first data 1DATA may be temporarily stored in the second cache 2CAH that exchanges data with the host 2000. For example, in the second cache 2CAH, the first index ID01, the first logical address LA01 to which the first index ID01 is allocated, and the first data 1DATA stored in the physical address mapped to the first logical address LA01 may be stored. When the host 2000 requests data corresponding to the first logical address LA01 during the read operation, the controller 1200 may search for the first logical address LA01 in the second cache 2CAH of the cache group 420. When the first logical address LA01 is determined to be stored in the second cache 2CAH, the controller 1200 may output the first data 1DATA stored in the second cache 2CAH to the host 2000.

Even though there is no request from the host 2000, the controller 1200 may store data in the cache group 420 or output the stored data in a case where a background operation such as a garbage collection is performed.

FIG. 8 illustrates an entry table according to an embodiment of the present disclosure. The entry table shown in FIG. 8 may correspond to the entry table 430 shown in FIG. 5.

Referring to FIG. 8, the entry table 430 may include a plurality of entries, each of which includes information on data stored in each cache. For example, each of the entries may include index information ID#, cache information #CAH, data information #DATA, state information ST, new data information NEW, valid value information VAL, and recent change information LAT. For example, the index information ID#, the cache information #CAH, and the data information #DATA included in the entry may indicate information on the caches 1CAH to 3CAH, the index ID01, and the data 1DATA stored in the cache group 420 of FIG. 7.

The state information ST included in the entry may indicate a recent operation using data stored in each cache. For example, the state information ST may indicate a program operation P, a garbage collection G, or a read operation R. In addition, the state information ST may include information corresponding to one of various operations performed in the memory system 1000.

The new data information NEW may indicate whether the data stored in each cache is old data stored by a previous operation or data newly stored by a current operation. For example, when the new data information NEW for the data newly stored by the current operation is set to 1, the new data information NEW for the old data previously stored in the cache during the previous operation may be set to 0.

The valid value information VAL may indicate whether the data stored in each cache is valid data. For example, when the old data previously stored in the cache is changed by newly input data, data including both of the new data and the old data may become the valid data, and the valid value information VAL for the cache in which the valid data is stored may become 1. The valid value information VAL for a cache that stores the old data without storing new data, i.e., the valid value information VAL for a cache that is not updated with new data, may become 0. The recent change information LAT may be set to 1 for a cache in which data is most recently changed, and may be set to 0 in the remaining caches in which data is not changed.

When data is input to the first cache 1CAH of FIG. 7, the cache manager 550 of FIG. 5 may search for the entries in the entry table 430 in a forward direction or a reverse direction according to whether data is stored in the second and third caches 2CAH and 3CAH of FIG. 7.

FIG. 9 is a flowchart illustrating a method of caching data during the program operation according to an embodiment of the present disclosure. The method shown in FIG. 9 will be described with reference to FIG. 1.

Referring to FIG. 9, the host 2000 may output data and a logical address together with a program request at S91. The controller 1200 may receive the data output from the host 2000 and store the data in a first cache 1CAH at S92. The controller 1200 may transmit the data temporarily stored in the first cache 1CAH to a third cache 3CAH at S93. The data stored in the third cache 3CAH may be flushed to the memory device 1100 together with a program command, generated by the controller 1200 in response to the program request, at S94. Flushing the data stored in the third cache 3CAH to the memory device 1100 means that the data stored in the third cache 3CAH is output to the memory device 1100. When the program operation is not completed or stopped or when an error occurs during the program operation and thus the program operation is performed again, the data stored in the third cache 3CAH may be flushed again.

FIG. 10 is a flowchart illustrating a method of caching data during the read operation according to an embodiment of the present disclosure. The method shown in FIG. 10 will be described with reference to FIG. 1.

Referring to FIG. 10, the host 2000 may output a logical address together with a read request at S101. The controller 1200 may find a physical address mapped to the logical address and transmit the physical address and a read command to the memory device 1100, the read command being generated by the controller 1200 in response to the read request. The memory device 1100 may perform the read operation in response to the physical address and the read command, and may output read data to the controller 1200. The controller 1200 may temporarily store the read data output from the memory device 1100 in the first cache 1CAH at S102. The controller 1200 may transmit the read data temporarily stored in the first cache 1CAH to the second cache 2CAH in order to output the read data to the host 2000 at S103. The controller 1200 may output the read data stored in the second cache 2CAH to the host 2000 at S104. After the read operation corresponding to the logical address is performed, when the host 2000 requests the read operation corresponding to the logical address again, the controller 1200 may output the read data stored in the second cache 2CAH to the host 2000 again without performing the read operation on the memory device 1100.

FIG. 11 is a flowchart illustrating an entry management method according to an embodiment of the present disclosure. The method shown in FIG. 11 will be described with reference to FIGS. 5 and 8.

Referring to FIG. 11, when new data is transmitted from the host 2000 or the memory device 1100 to the controller 1200, the controller 1200 may temporarily store the new data in the first cache 1CAH at S111. The controller 1200 may check whether there is old data cached in the second and third caches 2CAH and 3CAH at S112.

When it is determined at S112 that there is no old data cached in the second and third caches 2CAH and 3CAH, the cache manager 550 of FIG. 5 may search for the same index ID as an index of the new data stored in the first cache 1CAH in the entry table 430 of FIG. 8 in the forward direction at S113.

When no old data is cached in the second and third caches 2CAH and 3CAH, the same index ID as the index of the new data stored in the first cache 1CAH does not exist in the entry table 430. Therefore, after confirming that the same index ID does not exist in the entry table 430, the cache manager 550 may generate an entry for the new data stored in the first cache 1CAH at S114. For example, the cache manager 550 may generate the entry for the new data and store the generated entry in the entry table 430.

At S115, the cache manager 550 may cache the new data stored in the first cache 1CAH to the second cache 2CAH or the third cache 3CAH according to an operation request relating to the new data.

When it is determined at S112 that there is old data cached in the second and third caches 2CAH and 3CAH, the cache manager 550 may search for the same index ID as the index of the new data stored in the first cache 1CAH in the entry table 430 of FIG. 8 in the reversed direction at S116. The reason why the entry including the same index ID is searched for in the reverse direction is that, a probability that the entry including the same index ID is quickly searched for may increase when a recently stored entry is searched first. Referring to FIG. 8, the entry at the lowest portion of the entry table 430 is the recently stored entry.

The cache manager 550 may determine whether the same index ID as the index of the data stored in the first cache 1CAH is stored in the entry table 430 at S117.

When it is determined at S117 that the entry including the same index ID does not exist in the entry table 430, S114 may be performed.

On the other hand, when it is determined at S117 that the entry including the same index ID exists in the entry table 430, the cache manager 550 may release the entry including the same index ID from the entry table 430 at S118, and may generate a new entry for the new data and the old data at S119.

The cache manager 550 may cache the new data and the old data for which the new entry is generated in the second cache 2CAH or the third cache 3CAH according to the operation request at S120.

In the description with reference to FIG. 11, when the previously generated entry does not exist in the entry table 430, the cache manager 550 may newly generate the entry corresponding to the new data, and when the previously generated entry exists in the entry table 430, the cache manager 550 may release the previously generated entry corresponding to the old data and newly generate the new entry corresponding to both of the new data and the old data. Based on the description with reference to FIG. 11, various methods of managing the entry by the cache manager 550 are described as follows.

FIGS. 12A and 12B illustrate a method of managing an entry of new data when the new data is input to a controller in a state in which no old data exists in a cache according to an embodiment of the present disclosure. The method shown in FIGS. 12A and 12B will be described with reference to the memory system shown in FIG. 5.

Referring to FIGS. 5 and 12A, in a state in which no old data is stored in the second and third caches 2CAH and 3CAH of the cache group 420 and no entry is stored in the entry table 430, the host 2000 may provide the controller 1200 with a program request to store first data 1DATA corresponding to a first logical address LA01. The first data 1DATA and the first logical address LA01 output from the host 2000 may be temporarily stored in the first cache 1CAH of the cache group 420. The flash translation layer 520 may allocate a first index ID01 to the first logical address LA01, and store the first index ID01 in the first cache 1CAH.

The cache manager 550 may search for in the forward direction whether the first index ID01 is stored in the entry table 430.

Referring to FIG. 12A, the first index ID01 is not stored in the entry table 430. Therefore, referring to FIG. 12B, the cache manager 550 may transmit, to the third cache 3CAH, the first index ID01, the first logical address LA01, and the first data 1DATA that are stored in the first cache 1CAH.

Subsequently, the cache manager 550 may generate an entry for the first index ID01 and store the generated entry in the entry table 430. The entry may include the index information ID#, the cache information #CAH, the data information #DATA, the state information ST, the new data information NEW, the valid value information VAL, and the recent change information LAT, but may further include various other system information related to data. For example, the index information ID# in the entry of the first data 1DATA is 01 indicating the first index IDOL In the entry of the first data 1DATA, the cache information #CAH is 3 indicating that the first data 1DATA is stored in the third cache 3CAH. In the entry of the first data 1DATA, the data information #DATA is 1 indicating the first data 1DATA. In the entry of the first data 1DATA, the state information ST is P indicating that the first data 1DATA is received during a program operation. In the entry of the first data 1DATA, the new data information NEW is 1 indicating that the first data 1DATA is newly stored data in a current operation. In the entry of the first data 1DATA, the valid value information VAL is 1 indicating that the first data 1DATA is valid data. In the entry of the first data 1DATA, the recent change information LAT is 1 indicating that the first data 1DATA stored in the third cache 3CAH is most recently changed data.

FIGS. 13A and 13B illustrate a method of managing an entry of new data when the new data is input to the controller in a state in which old data exists in the cache according to an embodiment of the present disclosure. The method shown in FIGS. 13A and 13B will be described with reference to the memory system shown in FIG. 5.

Referring to FIGS. 5 and 13A, the first data 1DATA, the first logical address LA01 allocated to the first data 1DATA, and the first index ID01 allocated to first logical address LA01 may be stored in the third cache 3CAH, and the entry corresponding to the first index ID01 may be stored in the entry table 430. Assuming that the first data 1DATA is data programmed in the memory device 1100 by a previous program request, the index information ID# of the entry of the first data 1DATA stored in the entry table 430 may be 01, the cache information #CAH may be 3, the data information #DATA may be is 1, the state information ST may be P, the new data information NEW may be 0, and each of the valid value information VAL and the recent change information LAT may be 1. Here, a case where the new data information NEW is 0 indicates that the first data 1DATA is data processed in the previous operation and that the first data 1DATA is not data newly input in a current operation. That is, the first data 1DATA is old data.

In such a state, the host 2000 may provide the controller 1200 with a current program request to additionally store second data 2DATA corresponding to the first logical address LA01 in the cache group 420. The second data 2DATA and the first logical address LA01 output from the host 2000 may be temporarily stored in the first cache 1CAH of the cache group 420. The flash translation layer 520 may allocate the first index ID01 to the first logical address LA01 and store the first index ID01 together with the first logical address LA01 in the first cache 1CAH.

Since there is old data stored in the entry table 430, the cache manager 550 may search for, in the reverse direction, the first index ID01 in the entry table 430.

Referring to FIG. 13A, the first index ID01 is stored in the entry table 430. Therefore, referring to FIG. 13B, the cache manager 550 may transmit information stored in the first cache 1CAH to the third cache 3CAH, and release a first entry ENT1 for the first data 1DATA. Subsequently, the cache manager 550 may newly generate a second entry ENT2 including information on the second data 2DATA added to the first index ID01. Here, the first entry ENT1 refers to the existing entry stored in the entry table 430, and the second entry ENT2 refers to a newly generated entry by including information on data newly input to the first cache 1CAH.

Index information ID#, cache information #CAH, and state information ST of the second entry ENT2 are identical to the index information ID#, the cache information #CAH, and the state information ST of the first entry ENT1. However, data information #DATA of the second entry ENT2 indicates both of the first data 1DATA and the second data 2DATA. All of the new data information NEW, the valid value information VAL, and the recent change information LAT of the first entry ENT1 are changed to 0, and new data information NEW, valid value information VAL, and recent change information LAT of the second entry ENT2 have a value of 1.

In the changed entry table 430, since the valid value information VAL of the first entry ENT1 is changed to 0 and the valid value information VAL of the second entry ENT2 is set to 1, the second entry ENT2 rather than the first entry ENT1 may be selected as the entry corresponding to the first index ID01 in the entry table 430.

FIGS. 14A and 14B illustrate a method of managing an entry of new data when data stored in the cache is used according to an embodiment of the present disclosure. The method shown in FIGS. 14A and 14B will be described with reference to the memory system shown in FIG. 5.

Referring to FIG. 14A, while a read operation is performed in the memory system, new data read from the memory device 1100 may be temporarily stored in the first cache 1CAH and then stored in the second cache 2CAH. For example, during the read operation, the first data 1DATA read from the memory device may be stored in the second cache 2CAH via the first cache 1CAH and the entry shown in FIG. 14A may be generated for the first data DATA1 stored in the second cache 2CAH. After that, the second data 2DATA read from the memory device 1100 before the first data 1DATA stored in the second cache 2CAH is output to the host 2000 may be input to the first cache 1CAH. Since both of the second data 2DATA input to the first cache 1CAH and the first data 1DATA input to the second cache 2CAH correspond to the first logical address LA01, the same first index ID01 may be allocated to the first and second data 1DATA and 2DATA. When the indexes stored in the first and second caches 1CAH and 2CAH are the same, the cache manager 550 does not transmit the second data 2DATA stored in the first cache 1CAH to the second cache 2CAH until the first data 1DATA stored in the second cache 2CAH is output to the host 2000. For example, the cache manager 550 may delay a transmission operation of the second data 2DATA stored in the first cache 1CAH to the second cache 2CAH until the first data 1DATA stored in the second cache 2CAH is output to the host 2000.

Referring to FIG. 14B, when the first data 1DATA stored in the second cache 2CAH is output to the host 2000, the cache manager 550 may release the first entry ENT1 for the first data 1DATA in the entry table 430. Subsequently, the cache manager 550 may transmit the second data 2DATA to the second cache 2CAH, and generate the second entry ENT2 for the second data 2DATA in the entry table 430.

The index information ID#, the cache information #CAH, and the state information ST of the second entry ENT2 are identical to the index information ID#, the cache information #CAH, and the state information ST of the first entry ENT1. However, the data information #DATA of the second entry ENT2 indicates the second data 2DATA. All of the new data information NEW, the valid value information VAL, and the recent change information LAT of the first entry ENT1 are changed to 0, and the new data information NEW, the valid value information VAL, and the recent change information LAT of the second entry ENT2 are set to 1.

FIGS. 15A and 15B illustrate a method of managing an entry of data when new data having the same logical address as data stored in the cache is added inside the memory system according to an embodiment of the present disclosure. The method shown in FIGS. 15A and 15B will be described with reference to the memory system shown in FIG. 5.

Referring to FIG. 15A, while the garbage collection is performed in the memory system, data to which the same logical addresses are allocated may be input to the cache group 420. The garbage collection is a technique for collecting valid data from among a plurality of memory blocks included in the memory device 1100, storing the valid data in at least one free block, and using memory blocks in which only invalid data is stored as free blocks. For example, when the garbage collection is performed, a read operation of reading the valid data from selected memory blocks of the memory device 1100 may be performed, and a program operation of programming the valid data to the at least one free block may be performed.

For example, during the garbage collection, the read operation may be performed and the first data 1DATA read from the selected memory block may be stored in the third cache 3CAH. The first logical address LA01 may be allocated to the first data 1DATA, and the first index ID01 may be allocated to the first logical address LA01. Since the first data 1DATA to which the first index ID01 is allocated is stored in the third cache 3CAH, the first entry ENT1 including information on the first data 1DATA may be stored in the entry table 430 as shown in FIG. 15A. For example, in the first entry ENT1, the index information ID# is 01, the cache information #CAH is 3, the data information #DATA is 1, the state information ST is G, the new data information NEW is 0, the valid value information VAL is 1, and the recent change information LAT is 1. The index information ID#01 means the first index ID01, the cache information #CAH 3 means the third cache 3CAH, the data information #DATA 1 means the first data 1DATA, the state information ST G means the garbage collection, the new data information NEW 0 means that the first data 1DATA is not newly changed data, the valid value information VAL 1 means that the first data 1DATA is the valid data, and the recent change information LAT 1 means that the first data 1DATA is data most recently stored in the entry table 430.

The first data 1DATA stored in the third cache 3CAH may be required to be output to the memory device 1100 to be programmed in the free block included in the memory device 1100. However, the second data 2DATA corresponding to the first logical address LA01 may be output from the memory device 1100 before the first data 1DATA is output to the memory device 1100. The second data 2DATA may be data read from another memory block in the memory device 1100. The second data 2DATA, the first logical address LA01, and the first index ID01 are temporarily stored in the first cache 1CAH, and the second data 2DATA is required to be transmitted to the third cache 3CAH for a program operation of the garbage collection. However, before the first data 1DATA stored in the third cache 3CAH is output to the memory device 1100, the cache manager 550 may cause the second data 2DATA stored in the first cache 1CAH to wait until the first data 1DATA stored in the third cache 3CAH is flushed to the memory device 1100.

Referring to FIG. 15B, after the first data 1DATA stored in the third cache 3CAH is flushed to the memory device 1100, the cache manager 550 may release the first entry ENT1 stored in the entry table 430. Accordingly, the valid value information VAL of the first entry ENT1 is changed to 0.

Subsequently, the cache manager 550 may transmit the second data 2DATA stored in the first cache 1CAH to the third cache 3CAH, and generate the second entry ENT2 for the second data 2DATA in the entry table 430. The index information ID#, the cache information #CAH, and the state information ST of the second entry ENT2 are identical to the index information ID#, the cache information #CAH, and the state information ST of the first entry ENT1. The data information #DATA of the second entry ENT2 may be changed to 2 indicating the second data 2DATA, and all of the new data information NEW, the valid value information VAL, and the recent change information LAT may be set to 1.

FIGS. 16A and 16B illustrate a method of managing an entry of data when new data having the same logical address as data stored in the cache is added from an outside of the memory system according to an embodiment of the present disclosure. The method shown in FIGS. 16A and 16B will be described with reference to the memory system shown in FIG. 5.

Referring to FIG. 16A, while the garbage collection is performed in the memory system, the data to which the same logical address is allocated may be input to the cache group 420.

For example, during the garbage collection, a read operation may be performed and the first data 1DATA read from the selected memory block may be stored in the third cache 3CAH. The first logical address LA01 may be allocated to the first data 1DATA, and the first index ID01 may be allocated to the first logical address LA01. Since the first data 1DATA to which the first index ID01 is allocated is stored in the third cache 3CAH, the first entry ENT1 including the information on the first data 1DATA may be stored in the entry table 430 as shown in FIG. 16A. For example, in the first entry ENT1, the index information ID# is 01, the cache information #CAH is 3, the data information #DATA is 1, the state information ST is changed to G, the new data information NEW is 0, the valid value information VAL is 1, and the recent change information LAT is 1. The index information ID#01 means the first index ID01, the cache information #CAH 3 means the third cache 3CAH, the data information #DATA 1 means the first data 1DATA, the state information ST G means the garbage collection, the new data information NEW 0 means that the first data 1DATA is not newly changed data, the valid value information VAL 1 means that the first data 1DATA is the valid data, and the recent change information LAT 1 means that the first data 1DATA is data most recently stored in the entry table 430.

The first data 1DATA stored in the third cache 3CAH may be required to be output to the memory device 1100 to be programmed in the free block included in the memory device 1100. However, a program request for the second data 2DATA corresponding to the first logical address LA01 may be output from the host 2000 before the first data 1DATA is output to the memory device 1100.

Referring to FIG. 16B, in order to additionally program the second data 2DATA with the first data 1DATA corresponding to the same logical address LA01 during the garbage collection, the second data 2DATA is transmitted to the third cache 3CAH and the cache manager 550 may release the first entry ENT1 stored in the entry table 430 before the first data 1DATA stored in the third cache 3CAH is flushed to the memory device 1100, and generate the second entry ENT2 for the first and second data 1DATA and 2DATA. For example, the index information ID# and the cache information #CAH of the second entry ENT2 are identical to the index information ID# and the cache information #CAH of the first entry ENT1. The state information ST of the second entry ENT2 may be set to P which means the program operation, the data information #DATA may be set to 1 and 2, which mean the first and second data 1DATA and 2DATA, and all of the new data information NEW, the valid value information VAL, and the recent change information LAT may be set to 1.

Figure 17:
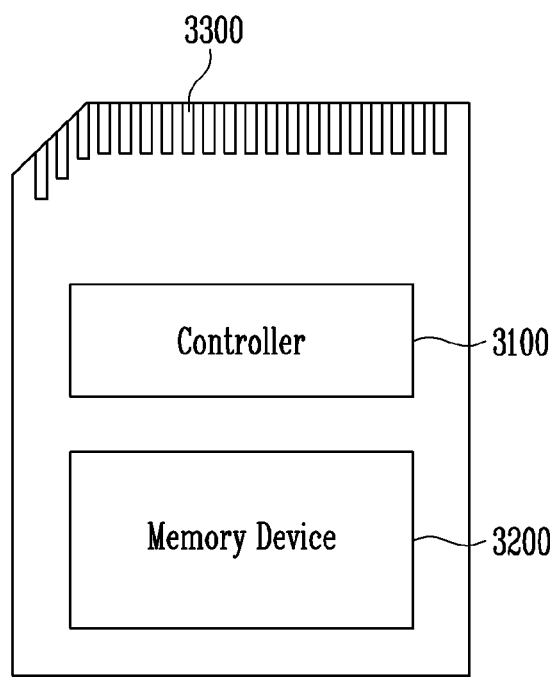
FIG. 17 is a diagram illustrating a memory card system to which a controller of the present disclosure is applied.

FIG. 17 is a diagram illustrating a memory card system to which a controller of the present disclosure is applied.

Referring to FIG. 17, the memory card system 3000 includes a controller 3100, a memory device 3200, and a connector 3300.

The controller 3100 is connected to the memory device 3200. The controller 3100 is configured to access the memory device 3200. For example, the controller 3100 may be configured to control a program, read, or erase operation of the memory device 3200 or control a background operation. The controller 3100 may be configured identically to the controller 1200 shown in FIG. 5. The controller 3100 is configured to provide an interface between the memory device 3200 and a host. The controller 3100 is configured to drive firmware for controlling the memory device 3200. For example, the controller 3100 may include components such as a random access memory (RAM), a processor, a host interface, a memory interface, and an error corrector.

The controller 3100 may communicate with an external device through the connector 3300. The controller 3100 may communicate with an external device (for example, the host) according to a specific communication standard. For example, the controller 3100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 3300 may be defined by at least one of the various communication standards described above.

For example, the memory device 3200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer torque magnetic RAM (STT-MRAM).

The controller 3100 and the memory device 3200 may be integrated into one semiconductor device to configure a memory card. For example, the controller 3100 and the memory device 3200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 18:
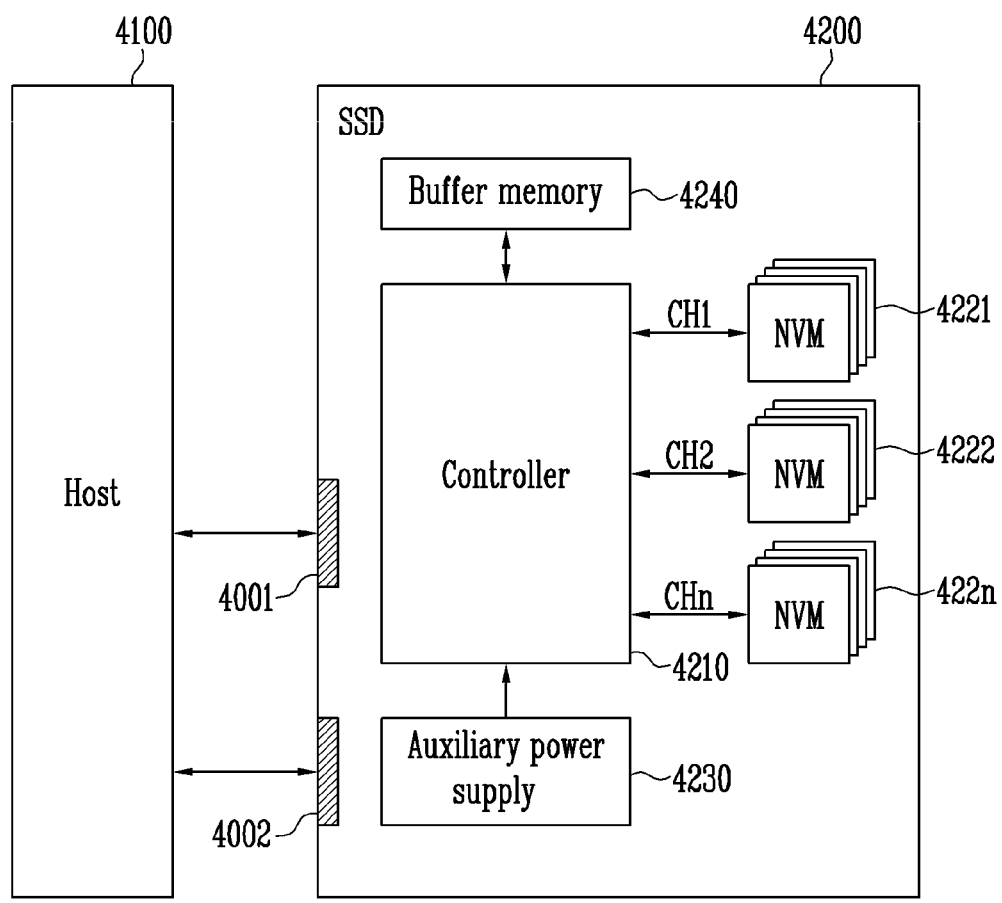
FIG. 18 is a diagram illustrating a solid state drive (SSD) system to which a controller of the present disclosure is applied.

FIG. 18 is a diagram illustrating a solid state drive (SSD) system to which a controller of the present disclosure is applied.

Referring to FIG. 18, the SSD system 4000 includes a host 4100 and an SSD 4200. The SSD 4200 exchanges a signal SIG with the host 4100 through a signal connector 4001 and receives power PWR through a power connector 4002. The SSD 4200 includes a controller 4210, a plurality of flash memories 4221 to 422n, an auxiliary power supply 4230, and a buffer memory 4240.

According to an embodiment of the present disclosure, the controller 4210 may perform a function of the controller 1200 described with reference to FIG. 5.

The controller 4210 may control the plurality of flash memories 4221 to 422n in response to the signal received from the host 4100. For example, the signal may be signals based on an interface between the host 4100 and the SSD 4200. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 4230 is connected to the host 4100 through the power connector 4002. The auxiliary power supply 4230 may be charged by receiving a power voltage from the host 4100. The auxiliary power supply 4230 may provide a power voltage of the SSD 4200 when power supply from the host 4100 is not smooth. For example, the auxiliary power supply 4230 may be positioned in the SSD 4200 or may be positioned outside the SSD 4200. For example, the auxiliary power supply 4230 may be positioned on a main board and may provide auxiliary power to the SSD 4200.

The buffer memory 4240 operates as a buffer memory of the SSD 4200. For example, the buffer memory 4240 may temporarily store data received from the host 4100 or data received from the plurality of flash memories 4221 to 422n, or may temporarily store metadata (for example, a mapping table) of the flash memories 4221 to 422n. The buffer memory 4240 may include a volatile memory such as a DRAM, an SDRAM, a DDR SDRAM, and an LPDDR SDRAM, or a nonvolatile memory such as an FRAM, a ReRAM, an STT-MRAM, and a PRAM.

What is claimed is:

1. A memory system, comprising:
    a memory device including memory blocks; and
    a controller configured to:
    in response to a program request or a read request for a selected memory block among the memory blocks being received from a host, store first data to which a first logical address is allocated in a cache group, and generate a first entry including first system information on the first data, and
    in response to second data to which the first logical address is allocated being stored in the cache group while the first data is stored in the cache group, generate a second entry including second system information on the second data or on both the first data and the second data.

2. The memory system of claim 1, wherein the controller comprises:
a flash translation layer configured to generate a map table by mapping a physical address of a memory block in which the first data is to be programmed to the first logical address;
a system buffer including the map table and the cache group, and including an entry table in which the first and second entries are stored; and
a cache manager configured to manage a transmission operation of the first and second data input to the cache group, and manage the first and second entries stored in the entry table.

3. The memory system of claim 2, wherein the cache group comprises:
a first cache configured to store data received from the host or the memory device, the data stored in the first cache including the first data and the second data;
a second cache configured to store the data received from the first cache prior to outputting the data to the host; and
a third cache configured to store the data received from the first cache prior to outputting the data to the memory device.

4. The memory system of claim 3, wherein the cache manager is configured to store the first data received from the host or the memory device in the first cache and then transmit the first data stored in the first cache to the second or third cache.

5. The memory system of claim 4, wherein when the second data is input to the first cache while the first data is stored in the second or third cache, the cache manager is configured to transmit the second data to the second or third cache, or postpone transmitting the second data to the second or third cache until the first data is output to the host or the memory device, according to an operation in which the first data is processed.

6. The memory system of claim 5, wherein when the first data is stored in the third cache and operations in which the first data and the second data are processed are a program operation, the cache manager is configured to release the first entry, transmit the second data to the third cache in which the first data is stored, and generate the second entry including the second system information on both the first data and the second data.

7. The memory system of claim 5, wherein when the first data is stored in the second cache and operations in which the first data and the second data are processed are a read operation, the cache manager is configured to maintain the second data in the first cache until the first data is output to the host, release the first entry, transmit the second data to the second cache after the first data is output to the host, and generate the second entry including the second system information on the second data.

8. The memory system of claim 5, wherein when the first and second data are read from the memory blocks, the first data is stored in the third cache, and the operation in which the first data is processed is a garbage collection, the cache manager is configured to release the first entry, transmit the second data to the third cache, and generate the second entry including the second system information on the second data.

9. The memory system of claim 5, wherein when the first data is read from the selected memory block, the second data is output from the host, the first data is stored in the third cache, and the operation in which the first data is processed is a garbage collection, the cache manager is configured to release the first entry, transmit the second data to the third cache in which the first data is stored, and generate the second entry including the second system information on both the first data and the second data.

10. The memory system of claim 1, wherein each of the first and second system information includes index information, cache information, data information, state information, new data information, valid value information, and recent change information.

11. A controller, comprising:
a cache group configured to store data output from a host or a memory device;
an entry table store at least one entry including index information corresponding to a logical address allocated to the data and information on a cache in which the data is stored; and
a cache manager configured to when logical addresses corresponding to first data and second data stored in the cache group are identical to each other, release a first entry including first system information on the first data and generate a second entry including second system information on the second data according to operations in which the first data and the second data are processed, the second data being inputted to the cache group while the first data is stored to the cache group.

12. The controller of claim 11, wherein the cache group comprises:
a first cache configured to store the data output from the host or the memory device;
a second cache configured to store the data transmitted from the first cache prior to outputting the data to the host; and
a third cache configured to store the data received from the first cache prior to outputting the data to the memory device.

13. The controller of claim 11, wherein each of the first and second system information includes index information of the data stored in the cache group, information of a cache in which the data is stored, data information of the data, state information of the data, new data information, valid value information, and recent change information.

14. The controller of claim 12, wherein when the second data is stored in the first cache after the first data output from the memory device is stored in the second cache, the cache manager is configured to hold the second data in the first cache until the first data is output to the host.

15. The controller of claim 14, wherein when the first data is output to the host, the cache manager is configured to generate the second entry including the second system information on the second data and store the second entry in the entry table.

16. The controller of claim 11, wherein when the first and second data to which same index information is allocated are stored in a same cache, the cache manager is configured to release the first entry, generate the second entry including the second system information on the first and second data, and store the second entry in the entry table.

17. The controller of claim 11, wherein when data is first stored in the cache group, the cache manager is configured to generate an entry for the data, and store the generated entry in the entry table.

18. A method of a controller including a cache group and an entry group, the method comprising:
receiving new data transmitted from a host or a memory device and storing the new data in a first cache of the cache group;
checking whether old data is stored in second and third caches of the cache group;

when it is determined that no old data is stored in the second and third caches while the new data is stored in the first cache, generating a first entry including a first index of the new data and storing the first entry in the entry group, and transmitting the new data stored in the first cache to the second cache or the third cache according to an operation request relating to the new data; and when it is determined that old data is stored in the second or third cache while the new data is stored in the first cache, searching for a second entry including the first index, releasing the second entry, generating a third entry including the first index of the new data, storing the third entry in the entry group, and transmitting the new data stored in the first cache to the second cache or the third cache according to the operation request.

19. The method of claim 18, wherein, in a program operation, the new data and the old data are stored in the third cache, and the third entry includes data information on the old data and the new data.

20. The method of claim 18, wherein, in a read operation, the new data is transmitted to the second cache after the old data is output to the host, and the third entry includes data information on the new data.

* * * * *